(12) United States Patent
Gehring et al.

(10) Patent No.: US 6,736,719 B1
(45) Date of Patent: May 18, 2004

(54) AIR DUCT OUTLET WITH JOYSTICK LOUVER CONTROL

(75) Inventors: Thomas F. J. Gehring, Ontario (CA); Ireneusz Jankowski, Ontario (CA); Dejan Havidic, Toronto (CA)

(73) Assignee: Collins & Aikman Products Co., Troy, MI (US)

( * ) Notice: Subject to any disclaimer, the term of this patent is extended or adjusted under 35 U.S.C. 154(b) by 0 days.

(21) Appl. No.: 10/442,422

(22) Filed: May 21, 2003

Related U.S. Application Data

(60) Provisional application No. 60/424,993, filed on Nov. 8, 2002.

(51) Int. Cl.[7] .................................................. B60H 1/34
(52) U.S. Cl. .......................... 454/155; 454/153; 454/143
(58) Field of Search ................................ 454/153, 155, 454/120, 143, 69

(56) References Cited

U.S. PATENT DOCUMENTS

| | | | |
|---|---|---|---|
| 3,456,574 A | 7/1969 | Jakeway ........................ 98/121 |
| 3,552,295 A | 1/1971 | Armstrong .................... 98/110 |
| 3,701,311 A | 10/1972 | McLarty ........................ 98/110 |
| 4,006,673 A | 2/1977 | Meyer et al. .................. 98/40 |
| 4,345,510 A | 8/1982 | Sterett ............................ 98/40 |
| 4,621,570 A | 11/1986 | Bolton et al. ................. 98/114 |
| 4,653,385 A * | 3/1987 | Ito et al. ....................... 454/313 |
| 4,702,156 A | 10/1987 | Sano ........................... 98/40.24 |
| 5,230,655 A | 7/1993 | Thompson et al. .......... 454/202 |
| 5,338,251 A * | 8/1994 | Matsumoto ................... 454/153 |
| 5,480,350 A | 1/1996 | Naruse ......................... 454/155 |
| 6,159,092 A | 12/2000 | Elder ........................... 454/155 |
| 6,386,965 B1 | 5/2002 | Greenwald et al. ........... 454/75 |
| 6,435,962 B1 | 8/2002 | Herron et al. ............... 454/290 |
| 6,443,831 B2 * | 9/2002 | Yabuya et al. .............. 454/155 |
| 6,497,616 B2 * | 12/2002 | Yamaguchi ................. 454/155 |

\* cited by examiner

*Primary Examiner*—Derek S. Boles
(74) *Attorney, Agent, or Firm*—Myers Bigel Sibley & Sajovec

(57) ABSTRACT

Air duct outlets having joystick controls are provided. A housing has an inlet, an outlet and a frame secured within the housing between the inlet and outlet. A louver assembly is operably coupled to the frame and includes a first set of louvers and a second set of louvers positioned upstream from the first set of louvers. The first set of louvers are operably connected together such that pivotal movement of any one of the louvers in the first set causes pivotal movement of the remaining louvers in the first set. The second set of louvers are operably connected together such that pivotal movement of any one of the louvers in the second set causes pivotal movement of the remaining louvers in the second set. A joystick is configured to pivot the first and second sets of louvers about respective axes.

20 Claims, 8 Drawing Sheets

AIR DUCT OUTLET WITH JOYSTICK LOUVER CONTROL

RELATED APPLICATION

This application claims the benefit of U.S. Provisional Application No. 60/424,993, filed Nov. 8, 2002, the disclosure of which is incorporated herein by reference in its entirety as if set forth fully herein.

FIELD OF THE INVENTION

The present invention relates generally to vehicles and, more particularly, to air duct outlets utilized within vehicles.

BACKGROUND OF THE INVENTION

Conventionally, vehicle interiors are provided with one or more air duct outlets which are connected by ducts to an outside air source and/or to a heating and/or air conditioning system that provides cooled and/or heated air. Because it is generally desirable for vehicle occupants to be able to adjust the direction of air flow within a vehicle interior, air duct outlets are typically provided with adjustable louvers. In addition, air duct outlets may be provided with dampers for allowing vehicle occupants to control the amount of air flowing therethrough.

Various types of air duct outlets can be provided depending upon special functions, air directability and design constraints within the vehicle. See, for example, U.S. Pat. Nos. 4,345,510; 4,702,156; and 4,006,673. Vehicle manufacturers are continuously seeking components, such as air duct outlets, that have enhanced functionality and durability, yet are cost effective to manufacture.

SUMMARY OF THE INVENTION

In view of the above discussion, air duct outlets having joystick controls are provided. According to embodiments of the present invention, an air duct outlet includes a housing having an inlet and an outlet. A frame is secured within the housing between the inlet and outlet. A louver assembly is operably coupled to the frame and is configured to adjust the direction of air flowing through the housing. The louver assembly includes a first set of louvers and a second set of louvers positioned upstream from the first set of louvers.

The first set of louvers are pivotally secured within the frame in spaced-apart adjacent relationship. Each louver in the first set is pivotally secured about one of a first plurality of substantially parallel axes. The first set of louvers are operably connected together such that pivotal movement of any one of the louvers in the first set causes pivotal movement of the remaining louvers in the first set.

The second set of louvers are pivotally secured within the frame in spaced-apart adjacent relationship. Each louver in the second set is pivotally secured about one of a second plurality of substantially parallel axes. The second set of louvers are operably connected together such that pivotal movement of any one of the louvers in the second set causes pivotal movement of the remaining louvers in the second set.

A joystick is configured to pivot the first and second sets of louvers about the respective first and second sets of axes. The joystick includes a proximal end portion pivotally connected to an intermediate portion of a louver in the first set of louvers via a pivot pin, and a distal end portion operably engaged with a louver in the second set of louvers.

Air duct outlets according to embodiments of the present invention allow for improved air flow directability. Moreover, air duct outlets according to embodiments of the present invention can facilitate new and improved styling opportunities for vehicle manufacturers and other manufacturers. Air duct outlets according to embodiments of the present invention are not limited to uses within vehicles (e.g., automobiles, trucks, boats, aircraft, etc.), but may also be utilized in residential and commercial heating, ventilating and air conditioning (HVAC) applications.

BRIEF DESCRIPTION OF THE DRAWINGS

The accompanying drawings, which form a part of the specification, illustrate key embodiments of the present invention. The drawings and description together serve to fully explain the invention.

DETAILED DESCRIPTION OF THE INVENTION

Figure 1:
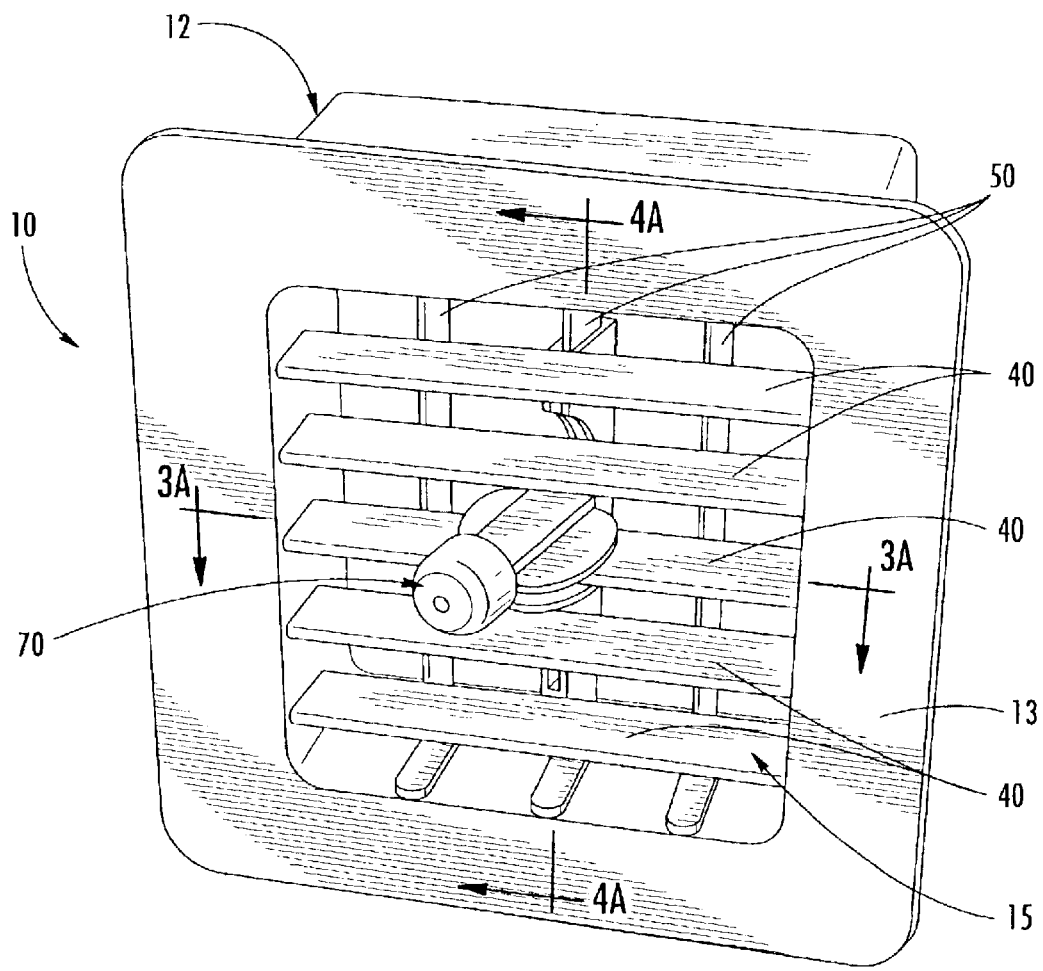
FIG. 1 is a front, perspective view of an air duct outlet, according to embodiments of the present invention.

The present invention now is described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

In the drawings, the thickness of lines, layers and regions may be exaggerated for clarity. It will be understood that when an element such as a layer, region, substrate, or panel is referred to as being "on" another element, it can be directly on the other element or intervening elements may also be present. In contrast, when an element is referred to as being "directly on" another element, there are no intervening elements present. It will be understood that when an element is referred to as being "connected" or "attached" to another element, it can be directly connected or attached to the other element or intervening elements may also be present. In contrast, when an element is referred to as being "directly connected" or "directly attached" to another element, there are no intervening elements present. The terms "upwardly", "downwardly", "vertical", "horizontal" and the like are used herein for the purpose of explanation only.

Referring to FIGS. 1–6, an air duct outlet 10, according to embodiments of the present invention, is illustrated. The illustrated air duct outlet 10 is designed for use within the interior compartments of vehicles, such as automobiles, trucks, trains, boats, aircraft, and the like. However, it is understood that air duct outlets according to embodiments of the present invention may be utilized in various environments (e.g., in homes and offices) and are not limited to use in vehicles.

Figure 2:
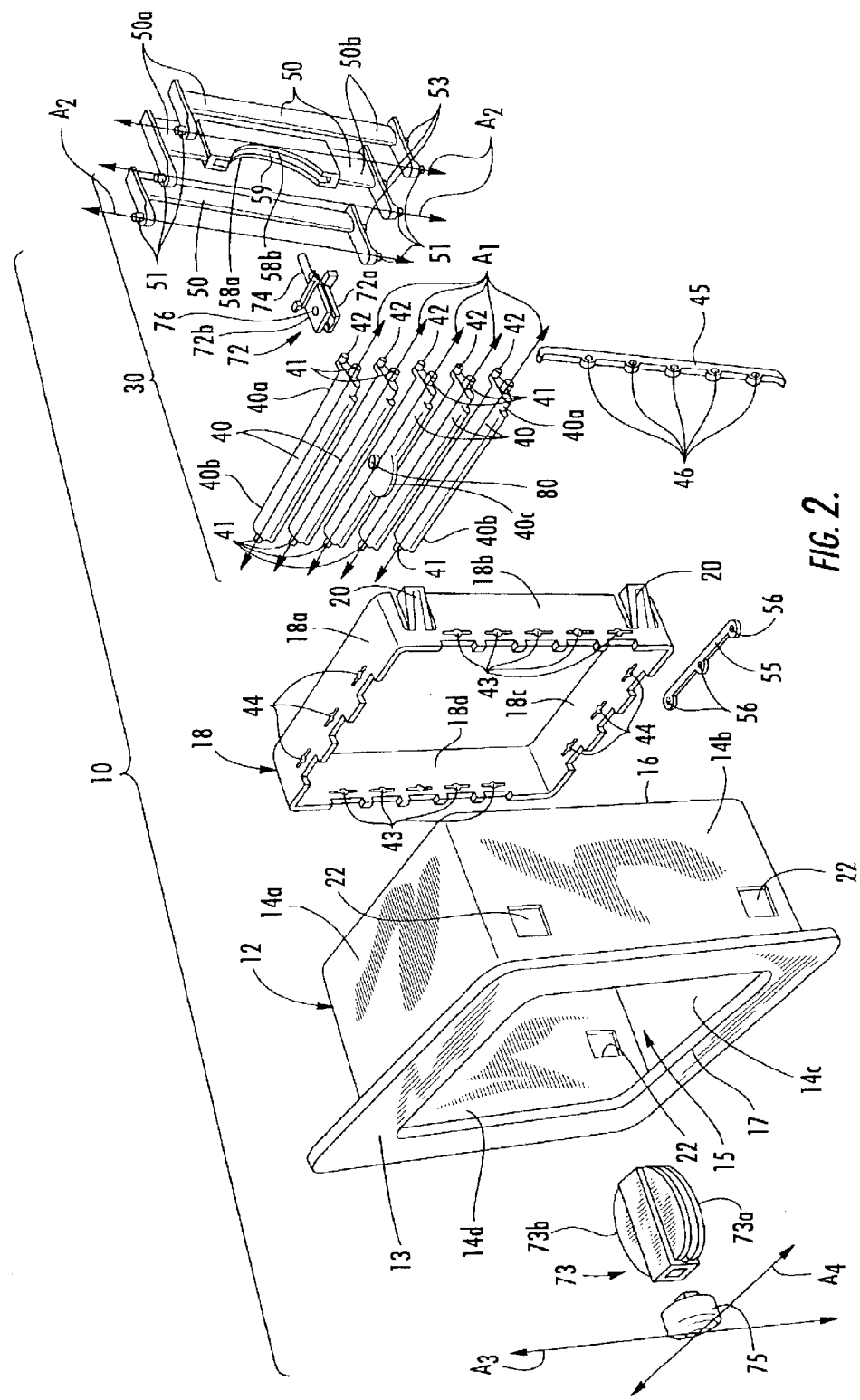
FIG. 2 is an exploded, perspective view of the air duct outlet, of FIG. 1.
Figure 3A:
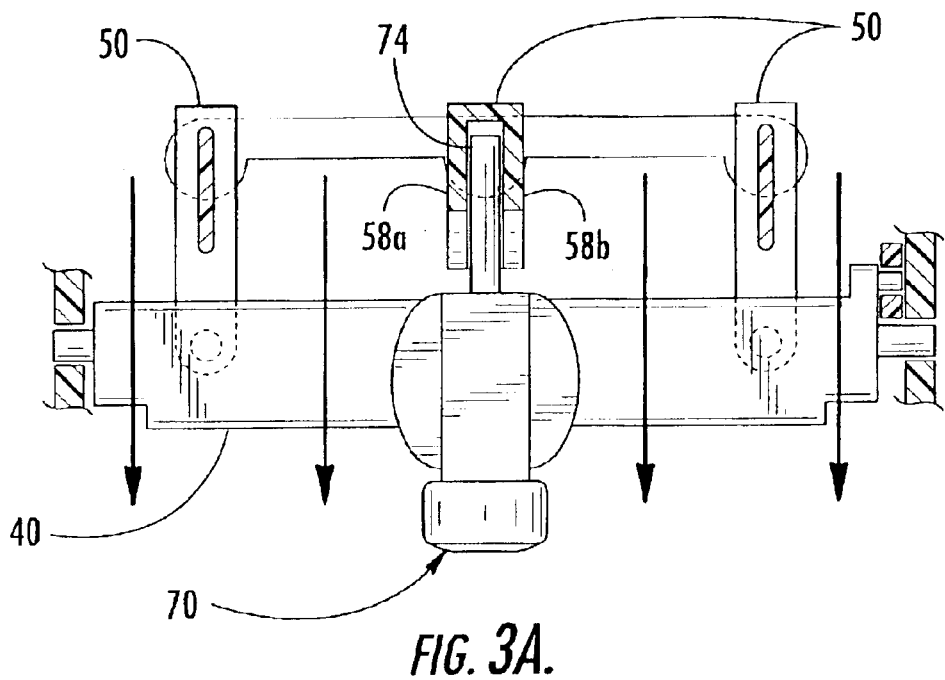
FIG. 3A is a section view of the air duct outlet, of FIG. 1 taken along lines 3A—3A.
Figure 3B:
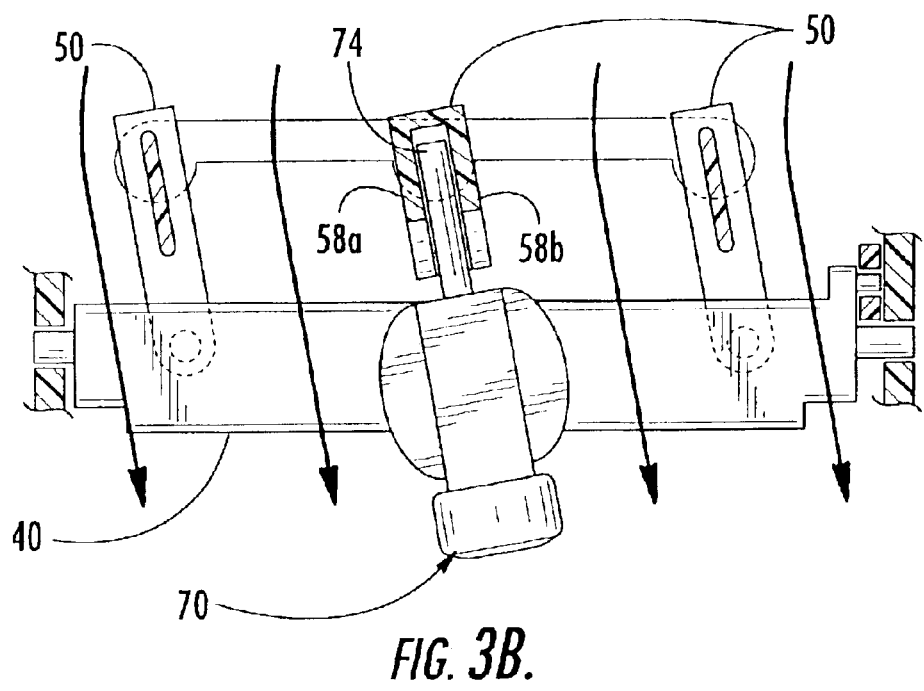
FIGS. 3B–3C illustrate movement of the joystick in FIG. 3A in respective different directions and the corresponding changes in air flow direction.
Figure 3C:
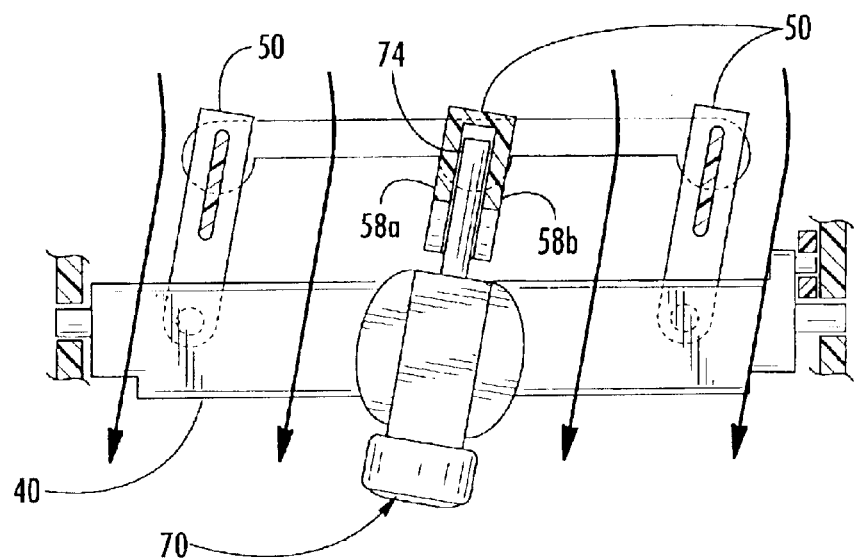

Referring initially to FIGS. 1–2, the illustrated air duct outlet 10 includes a housing 12. The illustrated housing 12 includes a front panel 13 and a plurality of walls 14a–14d extending from the front panel 13 that define an air passageway 15 that terminates at an air inlet 16 and an air outlet 17 in the housing 12. As would be understood by those skilled in the art, the housing 12 is configured to be connected to a source of air flow, such as a fan, that supplies heated and/or cooled air (as well as ambient outside air). Although the illustrated housing 12 has a generally rectangular configuration, other embodiments of the present invention may include housings with different shapes and configurations (e.g., arcuate, round, elongated, etc.)

A frame 18 is configured to be secured within the housing 12 between the housing inlet 16 and outlet 17. The illustrated frame 18 has a generally rectangular configuration and includes walls 18a–18d. The illustrated frame 18 includes a plurality of resilient members 20 extending from walls 18b, 18d that are configured to engage a respective plurality of apertures 22 in the housing 12 and to secure the frame 18 within the housing 12. However, the frame 18 may be secured within the housing 12 in various ways and is not limited to the illustrated embodiment.

The illustrated air duct outlet 10 includes a louver assembly 30 that is operably mounted within the housing 12 and that is configured to adjust the direction of air flowing through the housing passageway 15. The louver assembly 30 includes a first set of elongated louvers 40 that are pivotally secured within the passageway 15 in spaced-apart adjacent relationship. Each louver 40 in the first set is pivotally secured about one of a first plurality of substantially parallel axes $A_1$. The first set of louvers 40 are operably connected together such that pivotal movement of any one of the louvers 40 causes pivotal movement of the remaining louvers 40 in the first set.

The illustrated louver assembly 30 also includes a second set of elongated louvers 50 that are pivotally secured within the passageway 15 upstream from the first set of louvers 40. The first and second sets of louvers 40, 50 do not overlap or engage with each other. The second set of louvers 50 are pivotally secured within the passageway 15 in spaced-apart adjacent relationship. Each louver 50 in the second set is pivotally secured about one of a second plurality of substantially parallel axes $A_2$ that are transverse to axes $A_1$. The second set of louvers 50 are operably connected together such that pivotal movement of any one of the louvers 50 causes pivotal movement of the remaining louvers 50 in the second set. In the illustrated embodiment, the first and second set of louvers 40, 50 are substantially orthogonal relative to each other.

Pivot axes $A_1$ and $A_2$ may, but need not, lie in the same plane (i.e., coplanar). According to embodiments of the present invention, $A_1$ and $A_2$ may lie in separate, different planes.

The first set of louvers 40 are pivotally secured to the frame 18 via respective pins 41 that extend from each end portion 40a, 40b of each louver 40, as illustrated. Each pin 41 engages a respective aperture 43 formed in walls 18b, 18d of frame 18 and defines an axis $A_1$ about which each louver 40 pivots. Apertures 43 are in spaced-apart, adjacent relationship to maintain the desired spacing of the louvers 40.

The first set of louvers 40 are movably connected together along end portion 40b thereof via a first connecting member 45. Pivotal movement of a single one of the louvers 40 causes pivotal movement of the remaining louvers 40. In the illustrated embodiment, the first connecting member 45 has a slender, elongated configuration with a plurality of spaced-apart apertures 46 formed therein. Each aperture 46 is configured to operably engage a respective pin 42 extending from louver end portion 40b.

The second set of louvers 50 are pivotally secured to the frame 18 via respective pins 51 that extend from each end portion 50a, 50b of each louver 50, as illustrated. Each pin 51 engages a respective aperture 44 formed in walls 18a, 18c of frame 18 and defines an axis $A_2$ about which each louver 50 pivots. Apertures 44 are in spaced-apart, adjacent relationship to maintain the desired spacing of louvers 50.

The second set of louvers 50 are movably connected together along end portions 50b thereof via a second connecting member 55. Pivotal movement of a single one of the louvers 50 causes pivotal movement of the remaining louvers 50. In the illustrated embodiment, the second connecting member 55 has a slender, elongated configuration with a plurality of spaced-apart apertures 56 formed therein. Each aperture 56 is configured to operably engage a respective pin 53 extending from louver end portion 50b.

Pivotal movement of the first and second sets of louvers 40, 50 about the respective axes $A_1$, $A_2$ is accomplished via joystick 70. Joystick 70 includes a proximal end portion 72 and a distal end portion 74. Attached to the proximal end portion 72 is a trim portion 73 having a knob 75 that is configured to be gripped by a user.

Figure 4A:
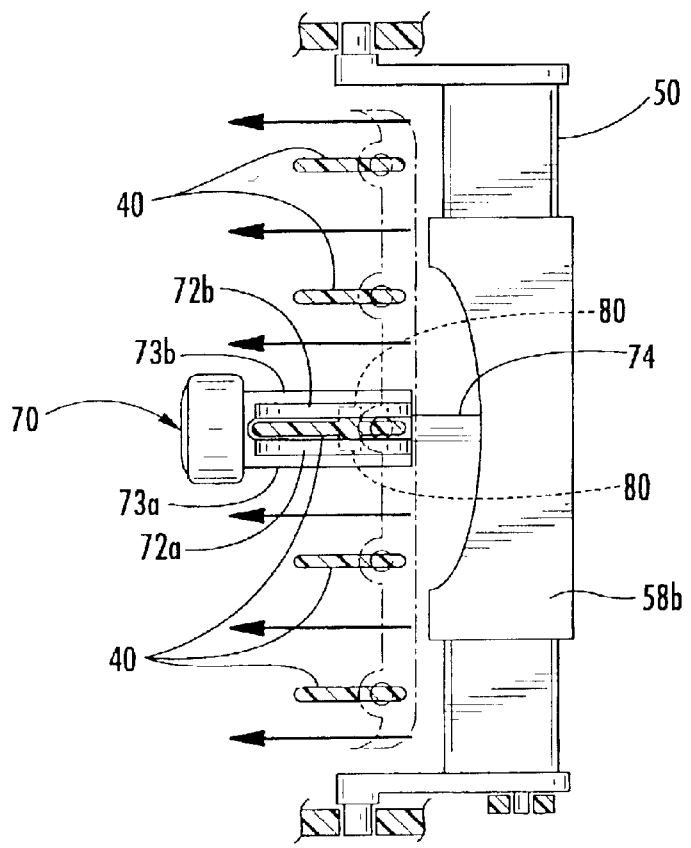
FIG. 4A is a section view of the air duct outlet, of FIG. 1 taken along lines 4A—4A.
Figures 4B, 4C:
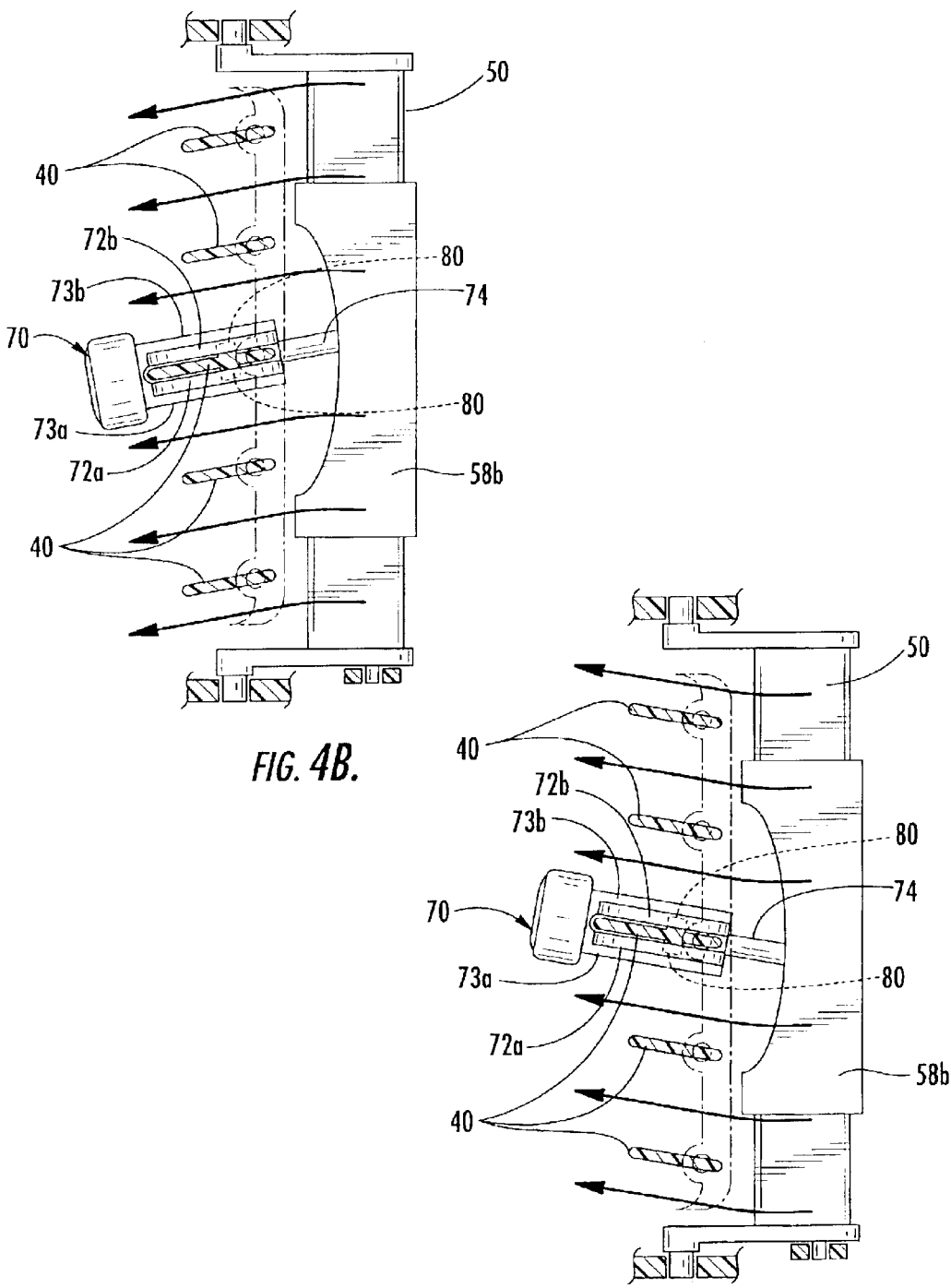
FIGS. 4B–4C illustrate movement of the joystick in FIG. 4A in respective different directions and the corresponding changes in air flow direction.
Figure 5A:
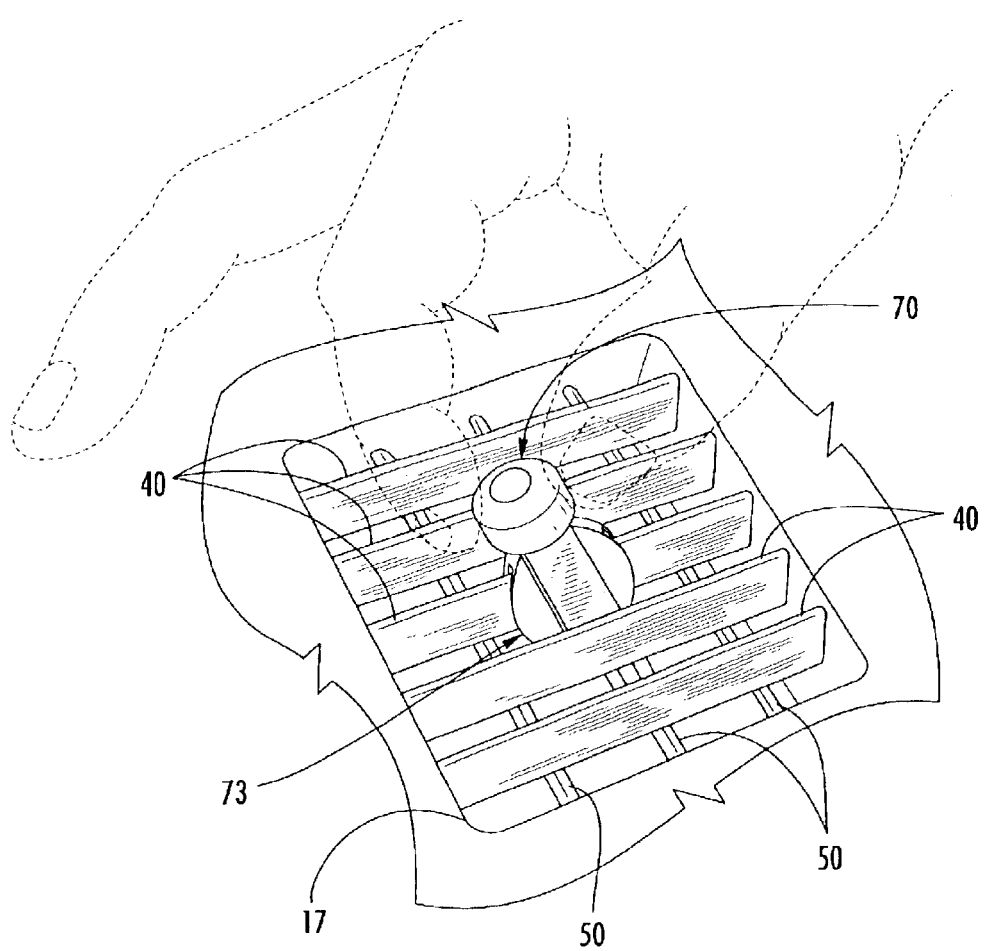
FIGS. 5A–5B are perspective views of the air duct outlet of FIG. 1 that illustrate user movement of the joystick to change air flow direction.
Figure 5B:
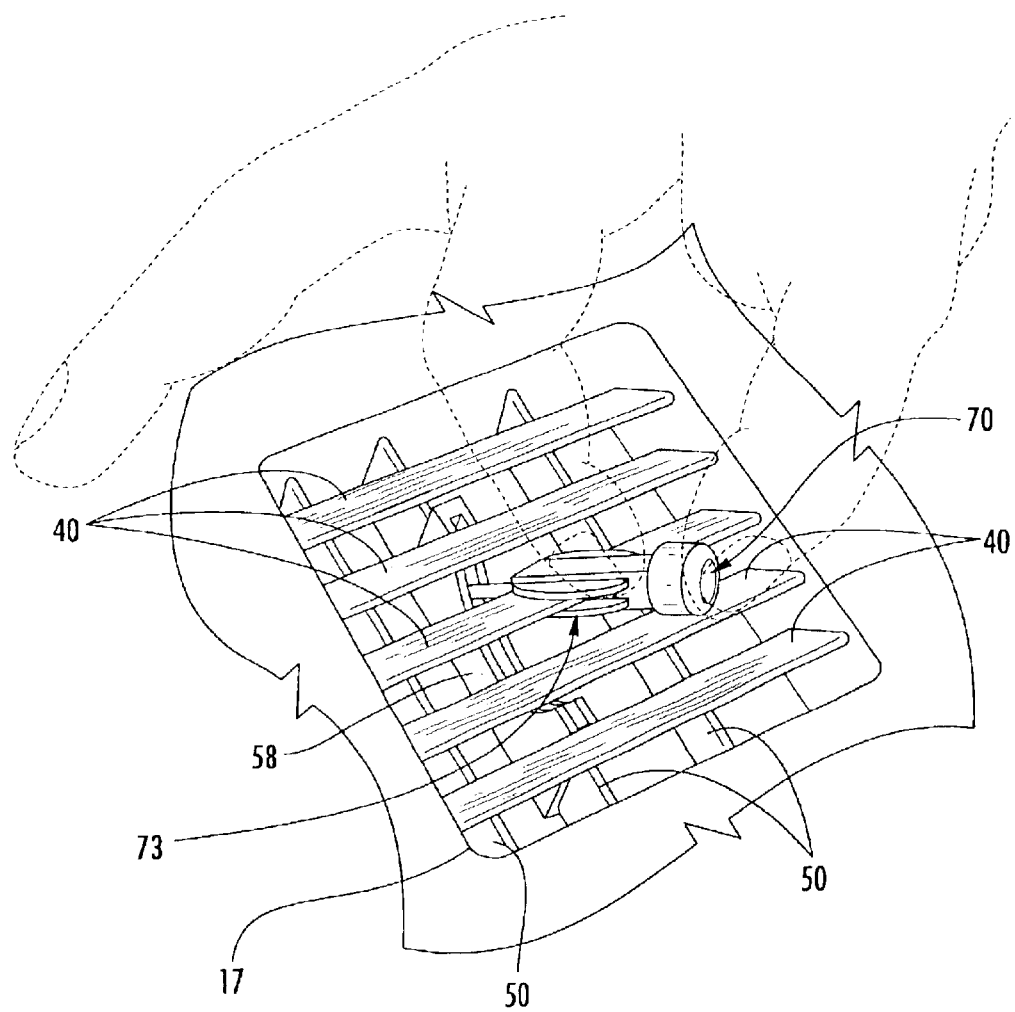

The illustrated joystick proximal end portion 72 includes spaced-apart panels 72a, 72b. An aperture 76 is formed in each of the panels 72a, 72b. The proximal end portion 72 is pivotally connected to an intermediate portion 40c of a louver 40 via pivot pins 80 which cooperates with apertures 76 in the joystick proximal end portion panels 72a, 72b. Trim portion 73 includes spaced-apart panels 73a, 73b, as illustrated. The proximal end portion 72 is disposed between panels 73a, 73b as illustrated in FIGS. 4A–4C.

The pivotal connection between the joystick proximal end portion 72 and the louver intermediate portion 40c allows the distal end 74 to move freely without causing movement of the first set of louvers 40 when the joystick 70 is moved in the directions indicated by double-headed arrow $A_4$ (i.e., when being used to pivot the second set of louvers 50 about axis $A_2$). In the illustrated embodiment, pivot pins 80 extend upwardly and downwardly from louver intermediate portion 40c (FIGS. 4A–4C) and each pivot pin 80 cooperates with a respective aperture 76 in a respective panel 72a, 72b.

Various ways of making a pivotal connection between the joystick proximal end portion 72 and the louver intermediate portion 40c can be utilized as would be understood by those skilled in the art. The present invention is not limited to the illustrated way of pivotally connecting the joystick proximal end portion 72 and the louver intermediate portion 40c.

The joystick distal end portion 74 is operably engaged with a louver 50. In the illustrated embodiment, the louver 50 includes a pair of panels 58a, 58b in face-to-face, spaced-apart relationship that define a slot 59. The joystick distal end portion 74 is disposed in the slot 59. Slot 59 is configured to allow the distal end 74 to move freely without causing movement of the second set of louvers 50 when the joystick 70 is moved in the directions indicated by double-headed arrow A₃ (i.e., when being used to pivot the first set of louvers about axis A₁).

Figure 6:
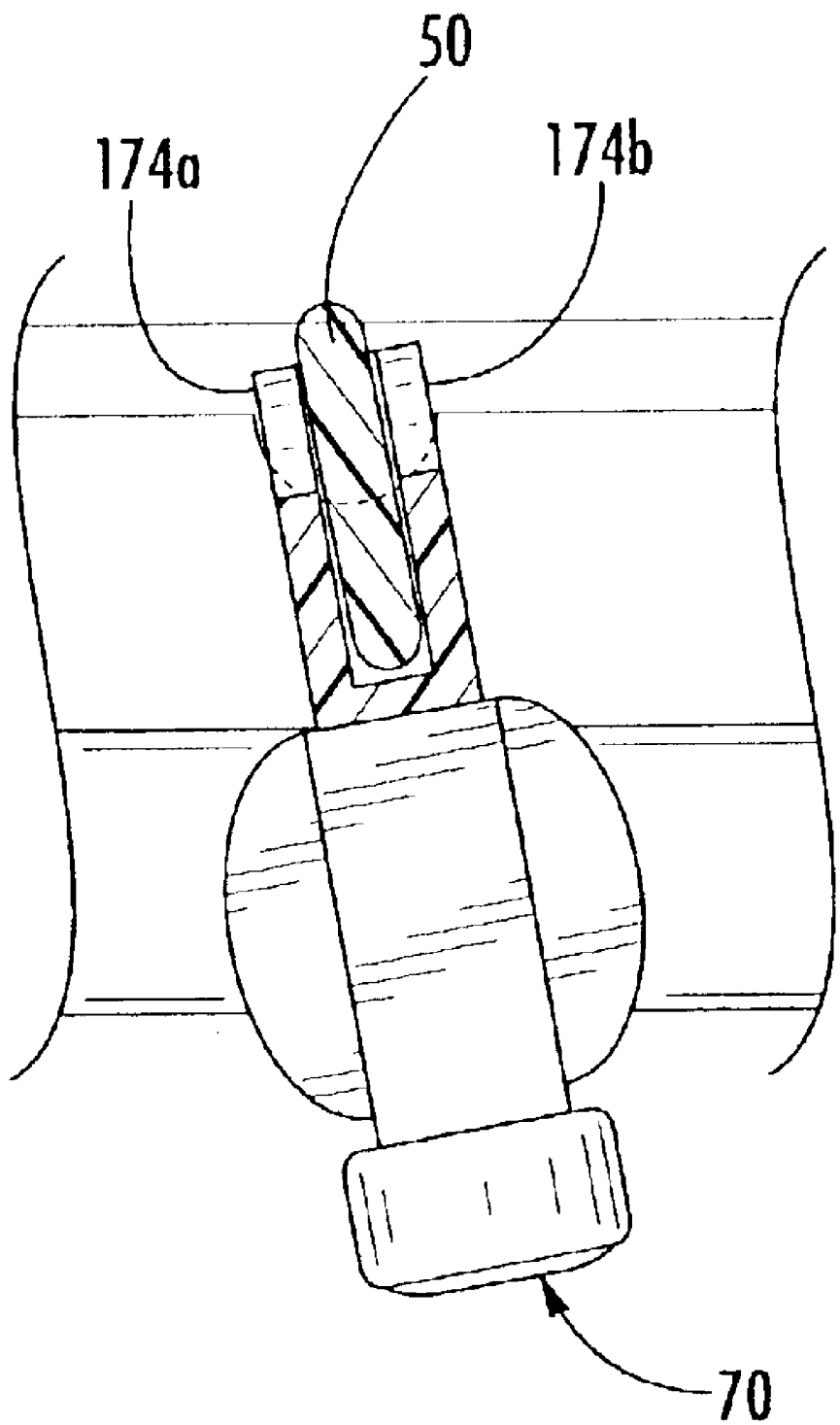
FIG. 6 is a partial view of an air duct outlet illustrating a joystick distal end according to an alternative embodiment of the present invention.

In the illustrated embodiment, the joystick distal end portion 74 is an elongated member. According to other embodiments of the present invention, the distal end portion 74 of the joystick 70 may be comprised of a pair of spaced-apart panels 174a, 174b as illustrated in FIG. 6. A portion of a central one of the second set of louvers 50 is positioned between the spaced-apart panels 74a, 74b.

Embodiments of the present invention are not limited to having the joystick 70 operably connected with only a central horizontal louver and a central vertical louver. The joystick may be operably connected to any louver within a louver assembly.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. An air duct outlet, comprising:
   a housing comprising an inlet and an outlet;
   a louver assembly operably coupled within the housing, wherein the louver assembly is configured to adjust the direction of air flowing through the housing, wherein the louver assembly comprises:
      a first set of louvers pivotally secured within the housing in spaced-apart adjacent relationship, each louver in the first set being pivotally secured about one of a first plurality of substantially parallel axes, wherein the first set of louvers are operably connected together such that pivotal movement of any one of the louvers in the first set causes pivotal movement of the remaining louvers in the first set; and
      a second set of louvers pivotally secured within the housing in spaced-apart adjacent relationship and positioned upstream from the first set of louvers, each louver in the second set being pivotally secured about one of a second plurality of substantially parallel axes, wherein the second set of louvers are operably connected together such that pivotal movement of any one of the louvers in the second set causes pivotal movement of the remaining louvers in the second set; and
   a joystick configured to pivot the first and second sets of louvers about the respective first and second sets of axes, wherein the joystick comprises a proximal end portion pivotally connected to an intermediate portion of a louver in the first set of louvers via a pivot pin, and a distal end portion operably engaged with a louver in the second set of louvers.

2. The air duct outlet of claim 1, wherein the louver in the second set of louvers comprises a pair of panels in face-to-face, spaced-apart relationship and wherein the joystick distal end portion is disposed between the pair of panels.

3. The air duct outlet of claim 1, wherein the joystick distal end portion comprises a pair of elongated arms in generally parallel, spaced-apart relationship, and wherein a portion of the louver in the second set of louvers is disposed between the pair of elongated arms.

4. The air duct outlet of claim 1, further comprising a frame secured within the housing, and wherein the louver assembly is operably coupled with the frame.

5. The air duct outlet of claim 1, wherein the joystick proximal end portion comprises a pair of members in generally parallel, spaced-apart relationship, and wherein the louver in the first set of louvers is disposed between the pair of members.

6. The air duct outlet of claim 1, wherein the first set of louvers are pivotally secured within the housing adjacent the housing outlet.

7. The air duct outlet of claim 1, wherein the second set of louvers are pivotally secured within the housing adjacent the housing inlet.

8. The air duct outlet of claim 1, wherein the first and second sets of axes lie within different respective planes.

9. The air duct outlet of claim 1, wherein the first and second sets of axes are transverse relative to each other.

10. The air duct outlet of claim 1, wherein the first and second sets of axes are orthogonal relative to each other.

11. The air duct outlet of claim 1, wherein each of the louvers in the first and second sets of louvers has a substantially rectangular configuration.

12. An air duct outlet, comprising:
   a housing comprising an inlet and an outlet;
   a frame secured within the housing between the inlet and outlet;
   a louver assembly operably coupled to the frame, wherein the louver assembly is configured to adjust the direction of air flowing through the housing, wherein the louver assembly comprises:
      a first set of louvers pivotally secured within the frame in spaced-apart adjacent relationship, each louver in the first set being pivotally secured about one of a first plurality of substantially parallel axes, wherein the first set of louvers are operably connected together such that pivotal movement of any one of the louvers in the first set causes pivotal movement of the remaining louvers in the first set; and
      a second set of louvers pivotally secured within the frame in spaced-apart adjacent relationship and positioned upstream from the first set of louvers, each louver in the second set being pivotally secured about one of a second plurality of substantially parallel axes, wherein the second set of louvers are operably connected together such that pivotal movement of any one of the louvers in the second set causes pivotal movement of the remaining louvers in the second set; and
   a joystick configured to pivot the first and second sets of louvers about the respective first and second sets of axes, wherein the joystick comprises a proximal end portion pivotally connected to an intermediate portion of a louver in the first set of louvers via a pivot pin, and a distal end portion operably engaged with a louver in the second set of louvers, wherein the louver in the second set of louvers comprises a pair of panels in face-to-face, spaced-apart relationship, and wherein the joystick distal end portion is disposed between the pair of panels.

13. The air duct outlet of claim 12, wherein the joystick distal end portion comprises a pair of elongated arms in generally parallel, spaced-apart relationship, and wherein a portion of the louver in the second set of louvers is disposed between the pair of elongated arms.

14. The air duct outlet of claim 12, wherein the joystick proximal end portion comprises a pair of members in generally parallel, spaced-apart relationship, and wherein the louver in the first set of louvers is disposed between the pair of members.

15. The air duct outlet of claim 12, wherein the first set of louvers are pivotally secured within the frame adjacent the housing outlet.

16. The air duct outlet of claim 12, wherein the second set of louvers are pivotally secured within the frame adjacent the housing inlet.

17. The air duct outlet of claim 12, wherein the first and second sets of axes lie within different respective planes.

18. The air duct outlet of claim 12, wherein the first and second sets of axes are transverse relative to each other.

19. The air duct outlet of claim 12, wherein the first and second sets of axes are orthogonal relative to each other.

20. The air duct outlet of claim 12, wherein each of the louvers in the first and second sets of louvers has a substantially rectangular configuration.

\* \* \* \* \*